United States Patent Office 3,170,567
Patented Feb. 23, 1965

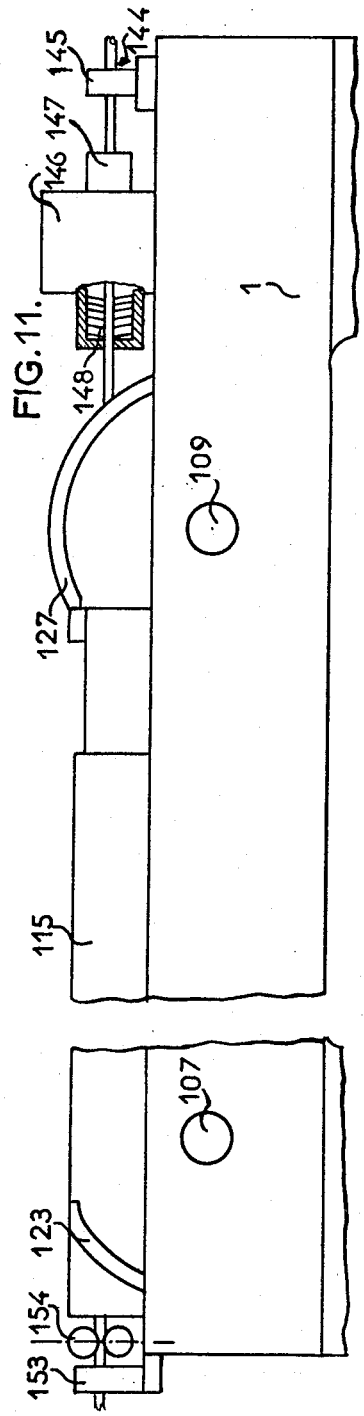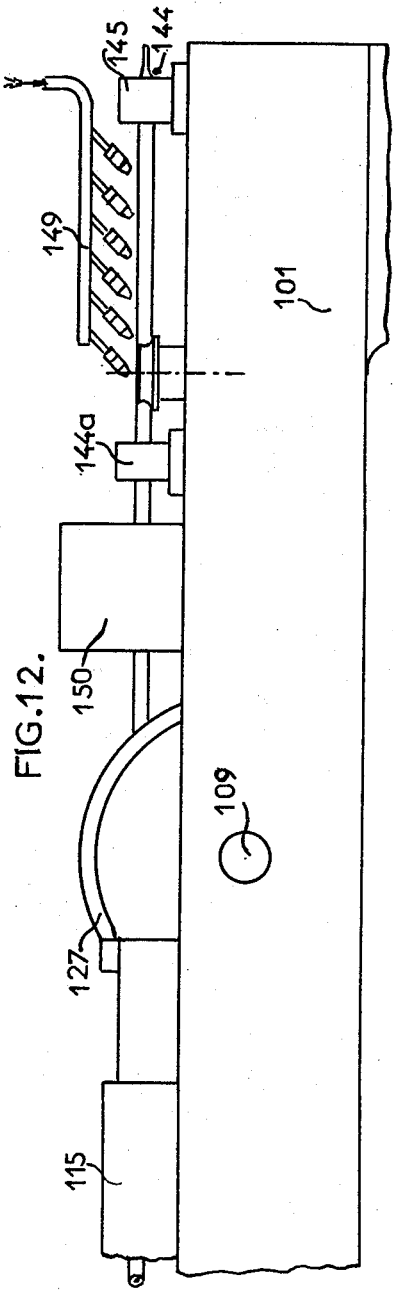

---

3,170,567
SYSTEM FOR APPLYING DRAFT FORCE TO AN ELONGATED OBJECT
René Capgras, 51 Rue du Rocher, Paris 8, France
Filed July 6, 1962, Ser. No. 208,027
Claims priority, application France, July 11, 1961, 867,571; July 25, 1961, 868,910
5 Claims. (Cl. 205—22)

This invention relates to systems for pulling elongated objects in a direction parallel to their length. The elongated objects contemplated by the invention may include any objects having a longitudinal dimension many times greater than their transverse dimensions, whether such objects be rigid, such as bars, tubes, and the like, or flexible, such as wires and ropes.

It is an object of the invention to provide a system for pulling an elongated object in the direction of its length, which system will be operable in a continuous manner rather than discontinuously. Considering for example a rope or other flexible elongated object, a continuous pulling force can easily be applied thereto provided the rope is wound around a drum or the like by simply rotating the drum, as in a winch. However, in many cases it is desirable or necessary to haul a rope without winding any part of it, because it may be desired to have both ends of the rope freely accessible. Heretofore, in such instances, the pulling systems used had to comprise some means of gripping the rope, advancing the gripping means a limited distance, then releasing the rope, retracting the released gripping means to an initial position, again gripping the rope, advancing it a further step, and so on repeatedly, such a process is obviously poor in efficiency because of the idle periods involved in returning the released gripping means to the initial position. It is an object of the invention to eliminate such idle periods.

A more specific object in this respect is to provide an improved winch, especially a portable winch, which will be devoid of winding means, such as a drum, and yet will be continuously operable without idle return periods.

It has been stated that the invention is also applicable to the pulling of elongated objects that are rigid rather than flexible, and in this connection the invention is especially concerned with the field of drawing benches, where bars, tubes, or profiled sections have to be pulled with considerable force through dies or the like. Heretofore, the means used for this purpose again were discontinuous in action. A "frog" type clamping device, comprising a pair of self-clamping levers, was made to grip a point of the bar or other stock, and was advanced the length of the draw-bench, then disengaged from the bar and returned to its initial position preparatory to engaging another point of the elongated stock; here again, only half the operating cycle was productive, resulting in poor efficiency, and the draw benches were usually provided of considerable length in an attempt to reduce the relative duration of the unproductive engaging and disengaging periods.

An important object of the invention is to provide a drawbench for the drawing of rigid stock that will be continuously operable. A broader object is to provide an improved class of draw-benches that will possess considerably greater efficiency, higher output capacity, and greater economy than any draw-benches in present use.

Further objects are to provide systems for pulling elongated objects in the direction of their length, which will be both continuously and intermittently operable without idle return periods, which will positively and reliably grip smooth surfaces, which will permit the development of extremely high draft forces, in which the pulling velocity can be readily proportioned to the draft force as for operating under constant power conditions, which can be driven by a continuously revolving motor and/or from a double-acting reciprocating drive member, which will have adjustable braking means for controllably retarding the load during reverse operation of the system without power consumption.

The above and further objects will appear more clearly as the description proceeds.

Broadly, the invention comprises a system for applying draft force to an elongated object comprising elongated support means, such as an endless chain, movable over a closed-loop path; a plurality of gripping devices supported in spaced relation from said support means, e.g. from the links of said endless chain, each gripper device being operable between a gripping and a releasing condition; means for feeding the object in a direction parallel and adjacent to a (preferably straight) section of the path; and means positioned adjacent said path and engageable with said gripper devices for cyclically operating said devices to gripping position for engaging said object at an input end of said section and to releasing position for disengaging said object at an output end of said section.

Some exemplary embodiments of the invention will now be described for purposes of illustration but not of limitation with reference to the accompanying drawings, wherein:

FIG. 4 is a side view of the portable winch from the side opposite to that from which FIG. 1 is seen, with certain parts shown in section;

FIG. 11 is a partial side view of a drawbench according to the invention, in simplified showing, and including a degreasing station for cleaning the stock issuing from the die and further provided with a finishing die at its output end;

FIG. 12 is a partial simplified side view of a tube drawing bench according to the invention, including a welding station and a cooling station.

Figure 1:
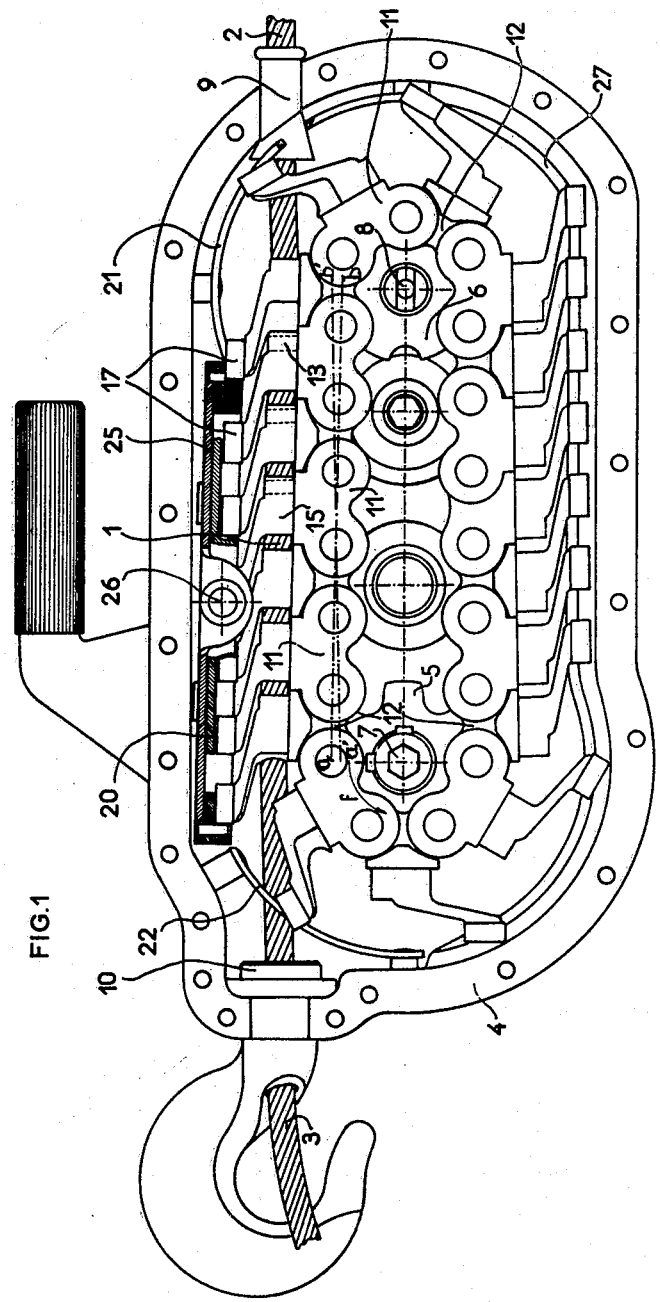
FIG. 1 is a side view of a portable winch constructed in accordance with the invention, with a side of the casing removed.

The apparatus shown comprises a casing 4 through which extends a steel rope or hawser 1 to be drawn, near one of the longitudinal sides of the casing. The rope 1 is shown as having its tensioned side 2 on the right of the drawing, and its trailing or free side at 3. Within the casing 4 two sprocket gears 5 and 6 are journalled on parallel shafts 7 and 8, and an endless chain composed of links 11 and 12 is trained about the gears. The rope 1 extends parallel and adjacent one, the upper, straight stretch of the endless chain and enters and leaves the casing 4 through an inlet opening 9 and an outlet 10. The chain includes male links 11 and female links 12 interpivoted in alternation. Each link 11, 12 of either type has a pair of pivots 13 and 14 projecting outwardly therefrom, the two pivots of each pair being spaced on a direction normal to the general plane of the chain. Pivoted on the pivots 13 and 14 of each pair are a pair of symmetrical levers 15 and 16 respectively, which are adapted to form the jaws of a clamping or gripping device having the rope 1 extending between them. The levers 15 and 16 are formed with outer portions which project away from the chain, as clearly visible in FIG. 1, and each lever has a roller 17, 18 respectively pivoted on its upturned free end about an axis parallel to the axes of pivots 13 and 14. The levers 15 and 16 are provided at their inwardly facing sides with respective gripper members 19, 19' formed or fitted thereto, having arcuate facing surfaces (see FIG. 3) corresponding in radius to that of the rope 1. Thus each chain link with its pair of levers 15, 16 constitutes a self-locking gripper device, sometimes known as a "frog" clamp, the clamping action of such a device depends on the angle between the two lines joining the pivot axes 13 and 14 with the respective clamps 19 and 19'; the larger this angle the greater the wedging and clamping action. The said angle may satisfactorily be selected within the range from 90 to 130°; larger angles result in excessive wedging of the clamps about the rope so that the disengaging of the rope, later described, is made difficult. Further it will be seen that the levers 15 and 16 provide for a mechanical amplification of the clamping force applied to the rollers 17 and 18 as presently described, and said levers are so dimensioned that the ratio of such mechanical advantage or force multiplication is about 3 to 1.

Figure 2:
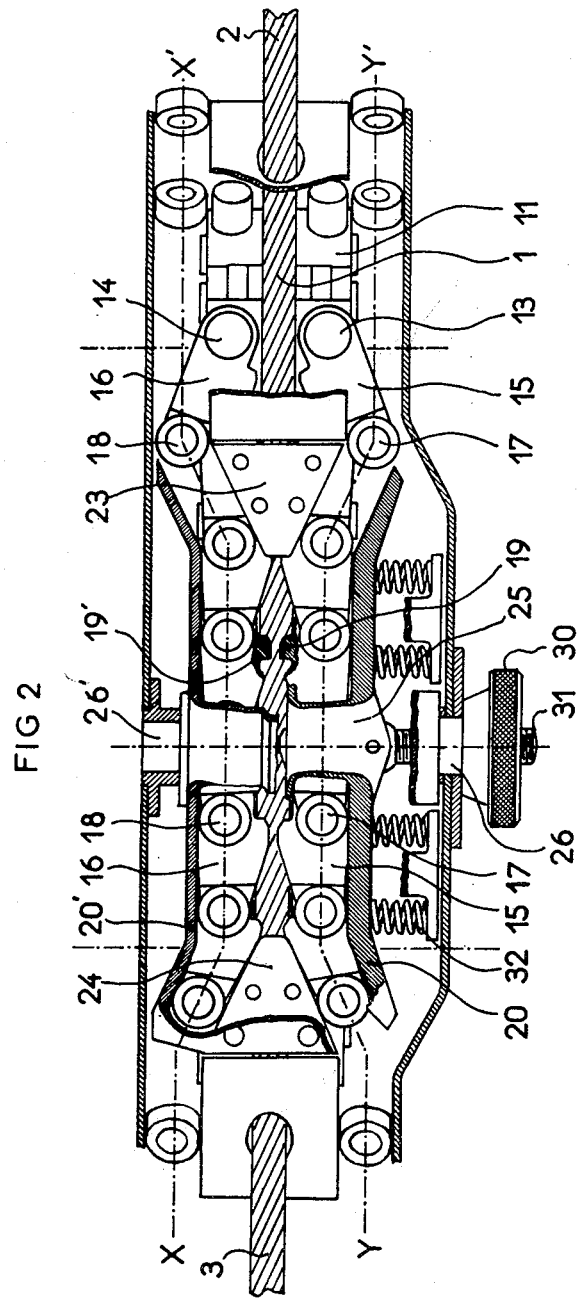
FIG. 2 is a partial plan view of the portable winch with the casing removed.

Camway means are provided for guiding the rollers 17 and 18 and thereby actuating levers 15 and 16 so as to apply them cyclically into and out of engagement with the rope 1 extending therebetween. For this purpose there is provided a double camway in the form of two spaced rails or surfaces 20 and 20', so arranged and contoured that when the endless chain is rotated about the gears 5 and 6, the rollers 17 and 18 at the ends of the levers 15 and 16 engage the respective cam rails 20 and 20' and their centres are thereby caused to describe the paths indicated in chain lines XX' and YY' in FIG. 2. The clamp levers 15 and 16 are thus cyclically displaced in rotation about their pivots 13 and 14 so as to spread apart or open out in the rope inlet region (right of FIG. 2) where the rope 1 first tangentially engages the chain, thereby permitting the rope to become readily inserted between the clamp levers, then the levers are closed in to grip the rope between them in the central region of the device, and are finally opened out again towards the outlet part of the device (left of FIG. 2) to enable the rope to be released. The camway includes in addition to the pair of spaced rails 20 and 20', a pair of wedge shaped guide members 23 and 24 adapted to support the inner sides of the rollers 17 and 18. Preferably the camways and guide blocks form part of a separately removable assembly comprising a guide plate 25 (FIG. 3), one or each logitudinal edge of which constitutes a related one of the cam rails 20 and 20'.

The chain pinions 5 and 6 are preferably made with a small diameter to reduce the over-all size of the device, and hence with a small number of teeth. This may result in an appreciable radial shift of each chain link as it moves past a pinion tooth, so that the tensioned (upper) stretch of the endless chain, and the related rollers, would describe a cyclic shifting movement parallel to a comomn direction during the rotational motion of the chain, if said tensioned side of the chain included an integral number of links. Preferably, as shown, the interaxial spacing of the chain pinions 5 and 6 is selected equal to an integral number of links plus one half link, and in the illustrated example said spacing is equal to 6.5 links. In this way the tensioned side of the chain is caused to describe a cyclic pivotal motion as between the positions indicated in chain lines at ab and a'b' in FIG. 1, and the outer surfaces of the rollers 17 and 18 correspondingly oscillate about an axis. Accordingly, the entire guide plate 25 is pivotally mounted in the casing 4 about a pivot 26 coaxial with said oscillatory axis. The shifting displacements of rollers 17, 18 over the cams 20, 20' are thereby eliminated and the operation of the device is improved.

In operation, rotation is imparted to chain pinion 5 (which is the drive pinion) in the direction indicated by arrow F, through drive means later described, the rotation may be imparted continuously or intermittently as desired. The chain is thereby rotated and the clamp levers are caused to open on the rope inlet side of the device so as to engage about opposite sides of the rope. Then the levers close in about the rope, gripping it firmly between them in the straight central part of the upper stretch of the chain, so as to exert a strong pulling action on the rope in the leftward direction; this pulling action is exerted simultaneously by a plurality of grippers in series, five in the embodiment shown so that a strong draft force is available. Thereafter the gripper levers open apart again to release the rope towards the outlet part of the device.

Desirably the cam rails 20 and 20' are extended on each side by extension rails 21 and 22 adapted to be engaged by the inner faces of the rollers 17 and 18 more positively and reliably to ensure a wide opening of the clamps at the input and output ends of the device. The rails 21 and 22 are in turn followed by further guide means as shown at 27, adapted to engage the outer sides of the rollers 17 and 18 and to close the clamping levers as they travel through the inactive (lower) stretch of the chain, in order to reduce the general size of the device in this region. The guide means 27 may conveniently be stamped or pressed from the walls of the casing 4.

Figure 3:
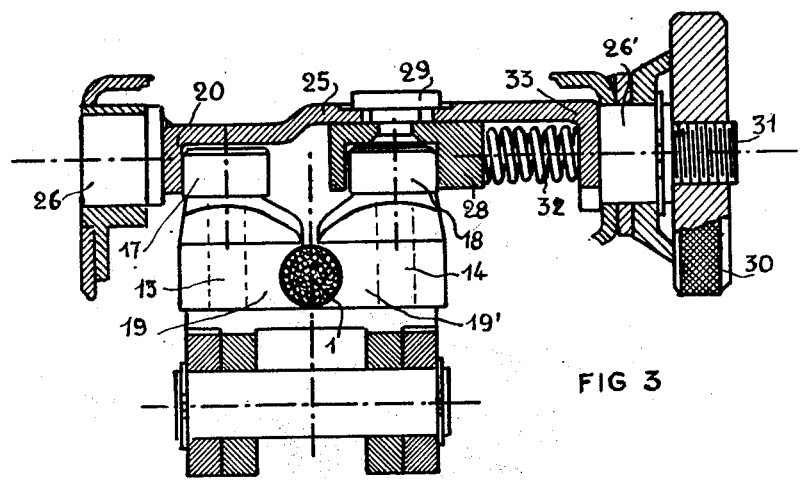
FIG. 3 is a transverse cross section of the portable winch on line A–B of FIG. 1.

FIG. 3 illustrates in detailed section a preferred embodiment of the oscillating guide plate assembly. The plate 25 is pivoted on the aligned pivots 26 and 26' and a side flange 20 of the plate constitutes the outer cam rail cooperating with the rollers 17. The rollers 18 are guided outwardly and inwardly by a part 28 which is slidably mounted on the guide plate 25, as by means of rivets 29 slidable in slots formed in plate 25. The guide member 28 can be adjusted in lateral position relative to the camming flange 20 of the guide plate by the manual rotation of a knurled knob 30 which has a threaded opening engaging a screw rod 31 projecting from the part 28. In order to thread the rope 1 through the apparatus, the knob 30 is rotated in such a direction that the engagement of the knob with the end face of pivot 26' advances the screw 31 and part 28 rightward in the figure. The roller 18 is thus moved away from the roller 17, causing a spreading-apart of the related clamping device including grippers 19 and 19', until sufficient clearance is available between them freely to insert the rope. A plurality of springs 32 interposed between a side flange 33 of guide plate 25 and guide member 28 urges said member toward the cam flange 20, so that after the rope 1 has been threaded through the apparatus as just described, reverse rotation of knob 30 will urge roller 18 back towards roller 17 and cause the grippers 19 and 19' to clamp the rope. As earlier mentioned, the pressure of the springs 32 is multiplied at the point of engagement of the grippers around the rope by the mechanical advantage of the lever arms, thereby supplementing the self-locking action of the clamping devices and imparting a high degree of reliability to the operation of the device.

The guide means 20 and 28 curve outwardly at their outer ends (FIG. 2) so that the rollers 17 and 18 are not subjected to the complementary action of the springs as the grippers are opened, and the triangular guide blocks 23 and 24 are required to act only against the self-locking pressure of the gripper devices but not the spring pressure.

Figure 4:
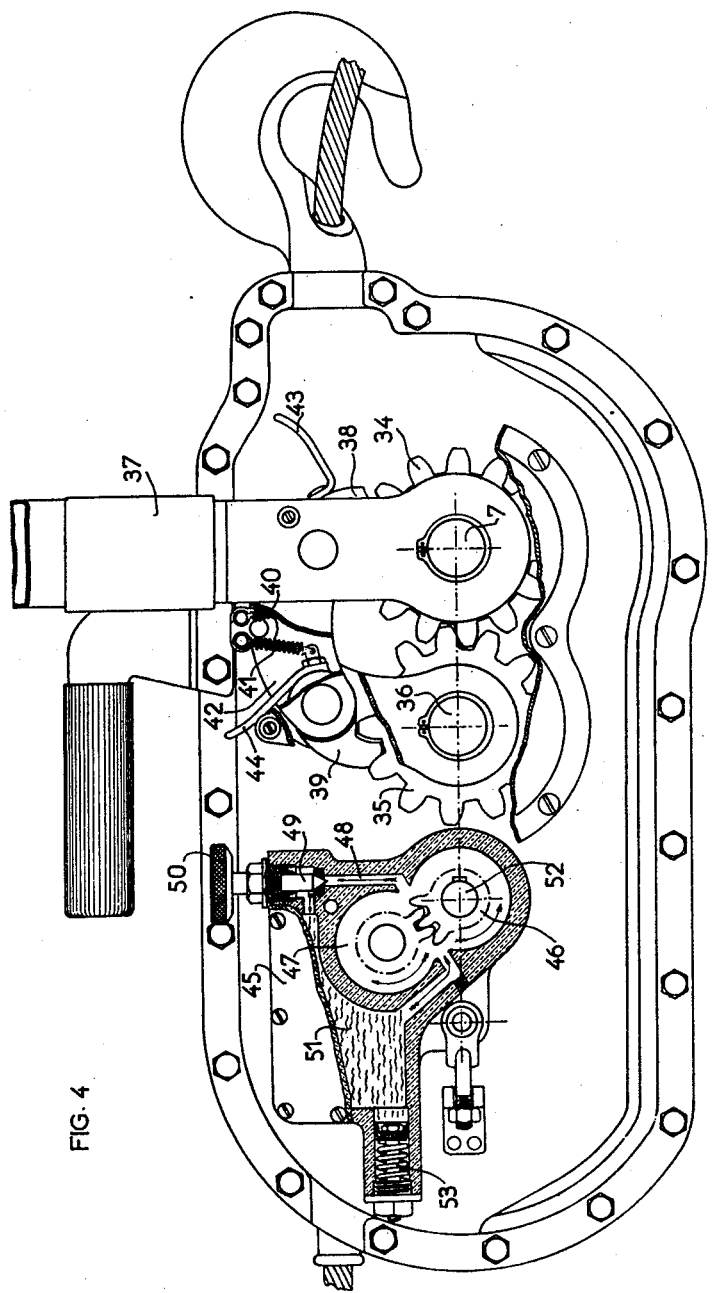

FIG. 4 illustrates one form of driving means for the apparatus of the invention. The shaft 7 on which the driver pinion 5 is secured projects at both ends beyond the sides of the casing 4. At one projecting end the shaft 7 may be formed with a square or other non-circular cross section for mechanical coupling with any suitable external source of kinetic power, such as a motor, a manual crank, or the like. At its other end the shaft 7 carries a gear 34 meshing with a gear 35 having an equal number of teeth keyed on a shaft 36 parallel to shaft 7 and journalled in suitable bearings formed in the casing.

If desired, a further gear (not shown), having a different number of teeth, e.g. in a 3/1 ratio to that of the gears 5 and 35, may be secured on a shaft provided with a square or other non-linear extremity to provide an output for kinetic power, and such further gear may mesh directly with the gear 35, or with another gear keyed on shaft 36, thereby making available a power source having a different reduction ratio.

A reciprocatory manual driving means is illustrated as comprising a lever 37 freely pivoted about the shaft 7 (or if desired on an auxiliary pivot positioned between shafts 7 and 36). Pivoted to the lever 37 is an arcuate rocker member 42 having a pair of oppositely projecting pawls 38 and 39 pivoted to its opposite ends and adapted to engage with the teeth of the two gears 34 and 35 respectively. Springs 40 and 41 attached to member 42 and to the pawls bias the latter into engagement with the gears. With this arrangement, both opposite reciprocatory strokes of the lever 37 in alternate directions are adapted to rotate the gear 34 and hence the chain pinion 5 and the endless chain continually in the same direction, which is the direction required to apply the draft force to the rope 1. This is true because, when lever 37 is rotated clockwise (FIG. 4), the pawl 38 engages an inter-tooth space of gear 34, rotating said gear clockwise, while pawl 39 is ratchetting over the teeth of gear 35 (rotated by gear 34) without effectively actuating said gear 35; conversely, on counter-clockwise rotation of lever 37, pawl 39 effectively engages the teeth of gear 35 to rotate the latter counterclockwise, so that gear 34 is again rotated clockwise due to the meshing relationship between gears 35 and 34, whereas pawl 38 in turn ratchets idly over the teeth of gear 34.

The pawl-and-ratchet arrangement described, in addition to providing the desirable double-acting operation just described, has a further advantage in that it provides a positive irreversible blocking means which will resist any tendency of the load to slip or backslide. This is so because when the lever 37 is stationary, both oppositely-projecting pawls engage with the respective gears 34 and 35 positively preventing rotation thereof in either direction. Means, such as arms 43 and 44 secured to the pawls 38 and 39, allow the pawls to be disengaged from the ratchet gears 34 and 35 when desired, and yielding latching means, such as spring detents, not shown, are preferably provided for holding the pawls in such disengaged positions. If only a single one of the pawls 38 and 39 is disengaged, the driving action of lever 37 becomes unidirectional, i.e. driving force is applied when the lever is rocked in one sense but not in the other. This may be an advantageous feature in cases where the operator is in an awkward position for operating the device. If both pawls are simultaneously disengaged, the load will drop, and it may be retarded by any suitable braking means, preferably the oil pump system now to be described.

There is preferably associated with the winch of the invention a gear pump 45 comprising a suitable fluid tight casing secured, e.g. screwed, to the winch casing 4 and constituting a reservoir for oil 51 and further containing a pair of meshing gears 46 and 47 operating as a conventional hydraulic gear pump. The pump chamber in which the gears 46 and 47 operate is connected with the tank chamber 51 through an inlet connection and an outlet connection 48, and an adjustable flow restricting valve 49 is provided for controlling the flow through the outlet 48 by rotation of a knurled knob 50 projecting at a convenient location near the top of the winch casing 4. The gear 46 is secured on a shaft 52 which is connected with the gear 5 through a one-way drive connection of any suitable kind, such as gearing and freewheel or overrunning clutch device, so that the pump will only be driven when the winch is operated in the direction to drop the load.

With valve 49 adjusted to a fully closed position, the pump 45 acts as a positive blocking means preventing a backsliding of the load. Adjustment of valve 49 to a suitable intermediate position, when pawls 38 and 39 are disengaged, makes it possible to control the slipping of the load precisely and automatically, with the heat generated being taken up and dissipated by the pump fluid rather than being absorbed by the rope. The pump housing 45 is provided with a filling plug device 53 including a spring-pressed plunger to take up variations in volume of the body of pump liquid, such as oil, due to temperature variations.

Reference will now be made to FIGS. 5-12 which illustrate the invention as embodied in a drawing bench for feeding profiled sections or other drawn products through a die or the like.

The drawing bench proper is shown at 101 and comprises a cast steel or iron frame having two pairs of aligned bearings at each end, one pair 102 and 103 (FIG. 8) being fixedly mounted and the other pair 105 and 106 (FIG. 6) being adjustable longitudinally of the bench for chain tensioning purposes as will later appear. Journalled in bearings 102 and 103 is a drive shaft 107 (FIGS. 7 and 8) having a chain driving sprocket gear 108 secured on it. Bearings 105 and 106 serve to journal an idler shaft 109 (FIG. 5) on which is secured a sprocket gear 110 similar to gear 108. The bodies of bearings 105 and 106 are bolted to the frame 101 which is provided with longitudinal slots for adjustment of said bearings by way of reversely-threaded screws 111, 111a, 111b, 111c.

Stretched around the gears 108 and 110 is an endless chain comprising male links 113 and female links 113a interpivoted in alternating relationship by means of pivots 114. Both types of links are similarly constructed on their outer sides as will be later described in detail. In order to maintain both sides of the endless chain straight and free of sag, especially as regards the active upper stretch of the chain, the chain link pivots 114 are provided with guide means in the form of a pair of longitudinal guide rails 115 (FIGS. 5-12) and 116 (FIGS. 9 and 10) which cooperate with said link pivots in the advancing stretch of the endless chain. Further, a pair of guide angles 117 and 117a (FIG. 7) are secured to the sides of the bench symmetrically thereon and in positions to cooperate with the receding lower stretch of the chain.

Each chain link 113 and 113a constitutes a separate gripping and driving unit. In the illustrated embodiment the links are preferably each machined from a single piece and comprises pairs of parallel spaced flanges $f$ interconnected by a heavy web $s$, from which a pair of transversely spaced upstanding pivots $p$ and $p'$ project (see FIGS. 9 and 10). Rotatably mounted on the pivots $p$ and $p'$ are a pair of symmetrical levers 118 and 119. The levers are deflected upwardly and the outer end of each lever has a vertical pin on which a needle bearing 120 is rotatably mounted and is retained by a spring clip.

Fitted over each lever at a point of it nearer the pivot axis $p$ or $p'$, say about ⅓ the spacing from said pivot to the pivot on which roller 120 is mounted, is a gripper member 121 having a nearly semi-circular inner concave contour corresponding in radius with that of the object, such as a profiled section, to be manipulated. The gripper members 121 are so positioned on the related symmetrical levers 118 and 119 that in the gripping position, when both levers are substantially parallel as later described, the gripping members cooperate to surround and firmly clamp the object. The gripper members 121 are preferably secured over the levers 118 and 119 by a taper fit. Each gripper 121 is preferably lined in the arcuate engaging area thereof with a strip of suitable friction material 122 bonded thereto by adhesive, riveting or otherwise, and serving to improve the grip around the profiled section or other article without the risk of damage inherent to metal to metal contact. The strip 122 may be made of brake lining material, e.g. asbestos and brass wire woven fabric having a high friction coefficient (of about 0.32) and high resistance to wear at high speeds, pressures and temperatures.

In an alternative arrangement not shown, the levers such as 118 and 119 may be pivoted about axes parallel to the direction of chain displacement on pivots secured to the links. Or in a further alternative, each link may carry a single lever, with the profiled section or other drawn article being abutted on its opposite side against a backing jaw surface fixed with respect to the link.

Figure 6:
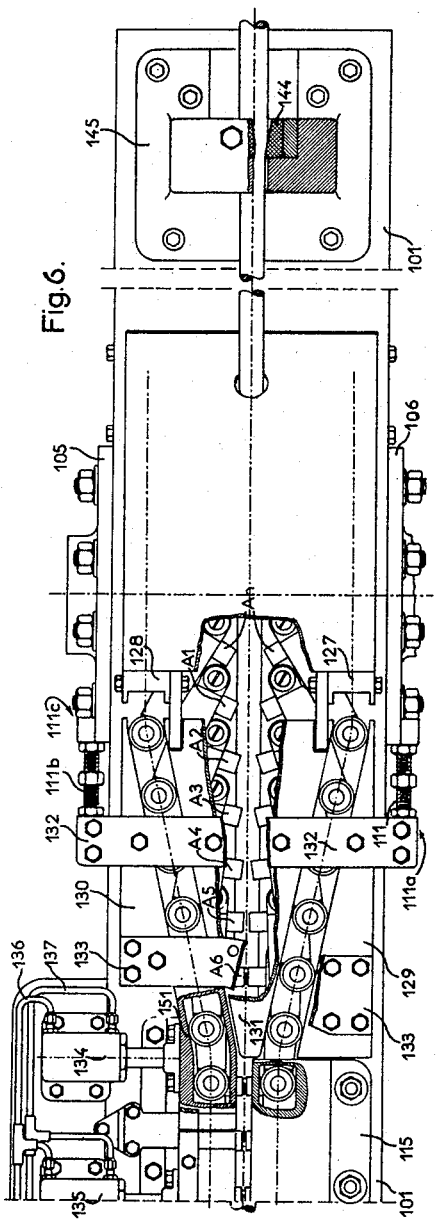
FIG. 6 is a plan view of the part of the drawbench shown in FIG. 5, partly in section.
Figure 8:
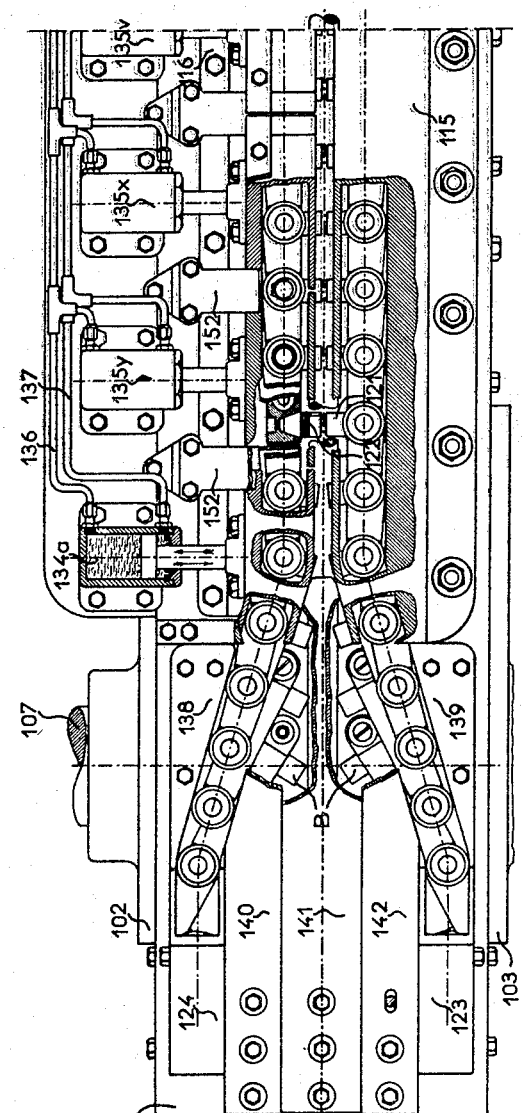
FIG. 8 is a plan view of the part of the drawbench shown in FIG. 7.

In the open condition of the levers, say with each lever rotated an angle 35 to 40° from the longitudinal axis of the link, the spacing between the grippers is such as to disengage the profiled section entirely and permit free movement of the link on its return or receding travel in the lower stretch of the chain. This open position occurs in the input and output regions of the upper (advancing) chain stretch, as shown at the positions A$n$ and B (FIGS. 6 and 8).

Figure 5:
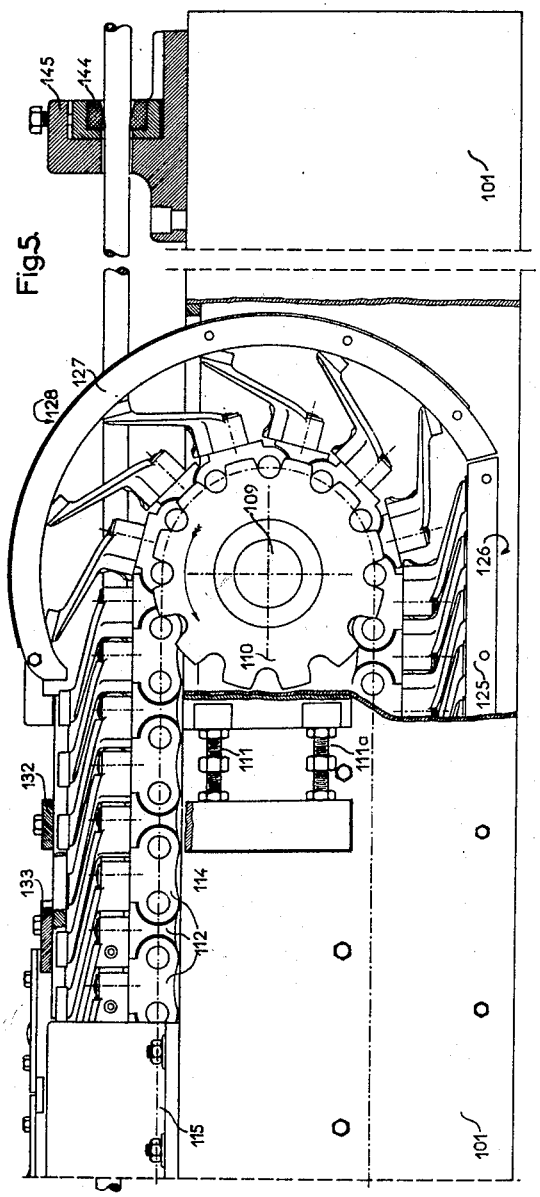
FIG. 5 is a side view, partly in section, showing one end of an improved continuous drawbench according to the invention, on the side including the input of the drawn stock.

With the chain being driven continuously in the counterclockwise direction of FIG. 5, the levers are cyclically actuated from open to closed and from closed to open condition by camming means cooperating with the rollers 120. Specifically, the levers first begin to be actuated towards their open position in each cycle at the point B (FIG. 8), as the chain links start moving down on their return journey which includes the under stretch of the chain. The opening movement is complete at point A$n$ (FIG. 6) as the links rise towards their forward movement on the upper stretch of the chain. To effect this opening movement, the rollers 120 are guided first by parallel spaced arcuate guide channels 123 and 124 (FIGS. 7 and 8), then by straight longitudinal channels 125 and 126 (FIGS. 5 and 8) extending along the base of the bench 101, and finally again by the arcuate guide channels 127 and 128 (FIGS. 5 and 6) bringing them to the point A$n$ at the start of the upper, active stretch of the chain. Thus on reaching point A$n$ the lever pairs are in open position and the bar to be drawn is able to insert itself freely between the grippers 121 of the link. The closing phase of the cycle now sets in. This closing movement of the lever pairs is effected by camming means including a pair of outer triangular camming blocks 129 and 130 (FIG. 6) cooperating with an intermediate triangular camming block 131 spaced from both blocks 129 and 130 so as to define with them a pair of converging guideways, which act on the rollers 120 to close in both levers of the pairs towards one another. Blocks 129–130 and 131 are rigidly interconnected by upper straps 132, 133 secured to frame 101. In the exemplary embodiment shown, the full closing movement is completed over a distance of about six times the inter-axial spacing between adjacent link pivots. Referring to FIG. 6, the progress of the closing movement is clearly visible through the positions A$n$, A1, A2, A3, A4, A5, A6.

Figure 9:
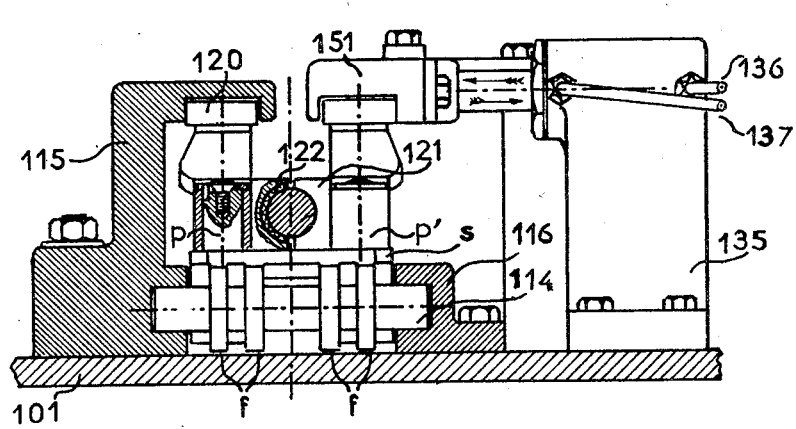
FIG. 9 is an elevational view of a complete chain link assembly constituting a gripping unit of the drawbench of the invention, and showing means for adjusting the gripping pressure.
Figure 10:
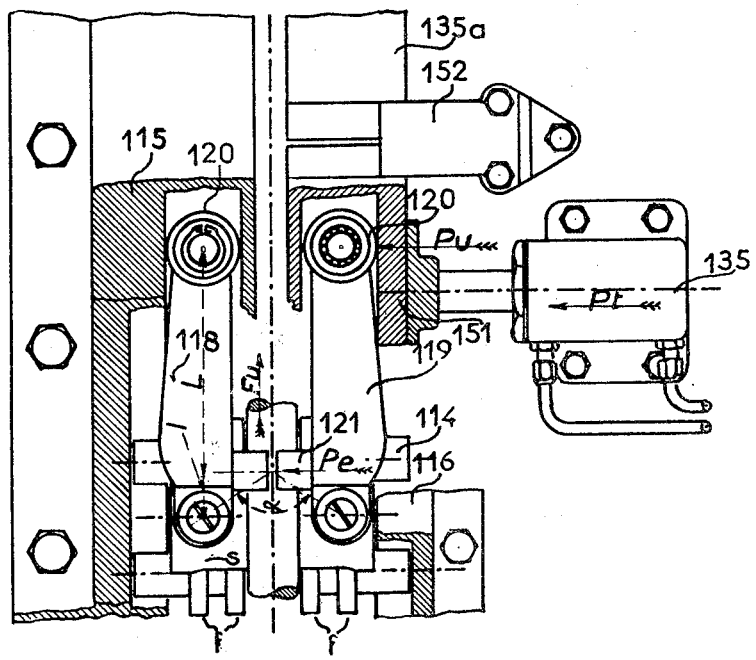
FIG. 10 is a plan view corresponding to FIG. 9.

Starting at position A5, the link rollers 120 are exposed to the action, on one side, of fixed longitudinal guide rail 115, earlier described and on the other side to that of a longitudinal guide channel or rail 151 which is transversely displaceable by the action of hydraulic presser units to control the clamping force applied through grippers 121. In the preferred embodiment, as shown in FIGS. 9 and 10, there are provided a series of separately displaceable guide channels 151 disposed end to end and separate from one another, each provided with its hydraulic presser unit 134, 135 . . . . The guide channel section associated with the initial presser unit 134 (FIG. 6) is made arcuate to merge with the camming blocks 131 and 130. The guide channel sections associated with presser unit 134, and with the remaining presser units 135, 135$a$, 135$b$, and so on, may be of such length as to distribute the total pressure exerted by each hydraulic presser unit over two or three rollers 120. The presser units 134, 135, 135$a$, etc, support at their top hydraulic actuator devices of conventional type. Each actuator cylinder is connected at its rear end with an oil pressure line 136 (FIGS. 6 and 8), so as to produce a synchronized, bodily movement of all the actuator pistons and apply equal pressures through the associated guide channel sections. The front end of each actuator cylinder is connected to another oil line 137, for the production of a bodily movement in the reverse direction.

Preferably, the guide channel sections 151 in addition to being positively retained by the hydraulic actuator pistons, are also guided transversely by stationary slideways 152 in which they are slidable.

It will be readily understood that the effective or useful length of the active stretch of the chain, is substantially equal to the distance between the center axes of the presser unit 134 (FIG. 6) and presser unit 134$a$ (FIG. 8) at the respective ends of the series. It will also be noted that one half the length of the guide channel 151 associated with presser unit 134 serves to complete the rotation of the levers so as to bring them into line with the straight active stretch of the chain, while the other half of the channel length begins to exert the pressure force, which is continued through the series of presser units 135 through 134$a$. Similarly one half the guide channel section of presser unit 134$a$ completes the pressure action while the other arcuate half initiates the lever opening movement. On the other side of the machine the lever opening movement is effected in a symmetrical manner by the arcuate channel of the upper part of guide rail 115 (FIG. 8).

Figure 7:
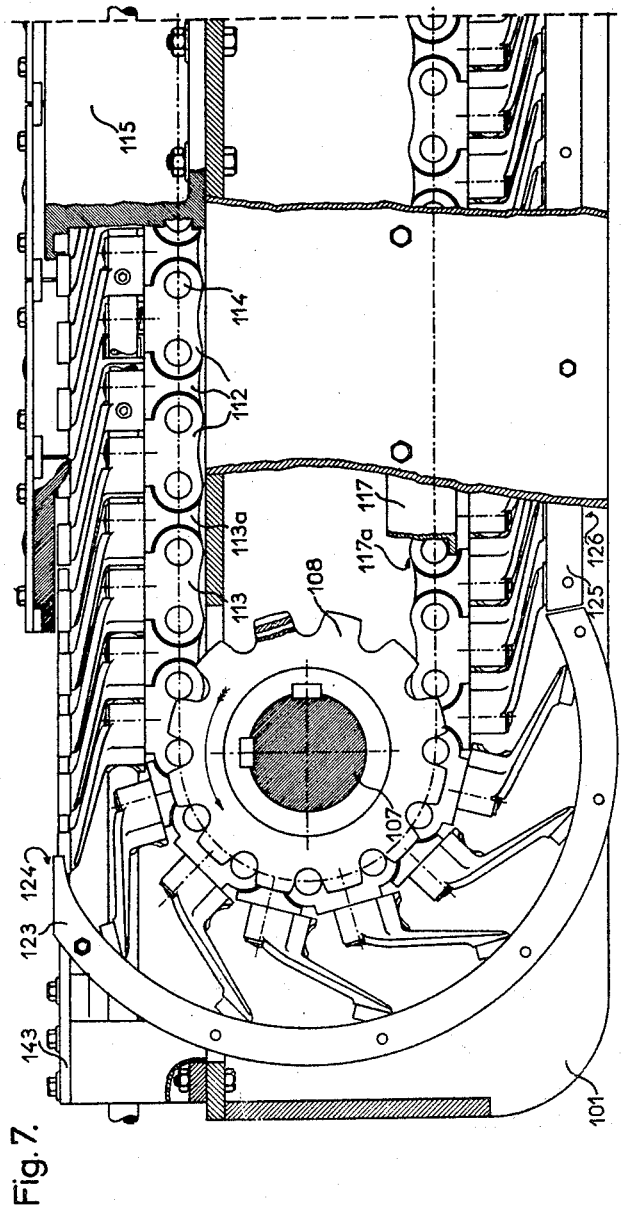
FIG. 7 is a side view, partly in section, of the other end part of the drawbench, including the drive means and the outlet for the drawn stock.

The final opening movement of the lever pairs is effected by the pair of outer triangular camming blocks 138 and 139 (FIG. 8), cooperating with an intermediate triangular camming assembly consisting of three individually adjustable members 140, 141, 142 so as to define a pair of diverging guideways which act on the rollers 120 to move the levers of each pair gradually and smoothly away from each other. The aforementioned camming blocks are rigidly secured to the frame, as by a part 143 (FIG. 7). In this way the tube, bar or other object being drawn is positively released from between the grippers. The opening phase of the clamping devices is now completed, and the fully opened clamping levers will now be returned as earlier described over the lower stretch of the chain to the point A$n$, where the cycle will repeat.

The opening of the clamping levers requires a distance substantially equal to that required for the closure operation, and such distance is so selected as to avert interference between the levers during their cyclic pivoting movements.

It will be clear from the above description that the active, upper stretch of the endless chain included between the vertical axes of the sprocket wheels 108 and 110 may be considered as consisting of three sections: two end sections in which the closure and opening of the clamping levers is performed, and an intermediate section in which the levers are held closed and the effective gripping and pulling work is accomplished. The two end sections represent substantially fixed distances that cannot practically be reduced below a minimum value over which the closing and opening movements can be satisfactorily performed. On the other hand the intermediate work section is greatly variable in length depending on the draft force to be developed and the permissible pressure applicable to the grippers.

The maximum permissible pressure is not determined so much by the possible surface scouring damage to the work being handled (since scouring is avoided by the use of the friction linings) but rather by the bodily distortion that the work might sustain under excessive gripping pressure. Hence the pressure value will vary with the type of work being handled and the operating conditions, i.e. the work material and cross sectional dimensions, and the operating temperature. By providing a larger number of gripping points, i.e. increasing the length of the effective working section, the unitary pressure applied at each gripping point may be reduced.

By way of illustration of the above, a method of computation will now be described for working out the number of pairs of clamping devices in simultaneous operation to be provided, for a given draft force in a drawbench according to the embodiment shown and described. The number of gripping points thus computed will give the number of chain links effectively operative at any time in the working stretch of the chain.

Considering first a chain link as a separate gripping unit (FIG. 10), the lever rollers 120 of the link are subjected to a closing force approximating one third the total pressure $Pt$ of the presser unit, which is alternately acting on two and three rollers. With the total pressure $Pt=600$ kg. the unitary pressure $Pu$ on the particular roller 120 will be 200 kg. If the leverage ratio of the levers is 5, the average pressure developed by a gripper against the opposite gripper will be $200 \times 5 = 1000$ kg. With the friction coefficient against dry smooth metal being 0.32, the normal unitary driving force $Fu$ developed by the gripper will be $1000 \times 0.32 = 320$ kg.

This force produced by the pressure applied to the rollers is supplemented by the self-locking force which increases with the lever angle $\alpha$ (FIG. 10). However, this supplemental force is disregarded in the present calculation so as to provide a large safety margin and allow for such occurrences as grease soiled areas on the stock being drawn, liable to reduce the friction coefficients, and also to reduce to a minimum the unitary pressures acting on the drawn articles.

The number of chain links in the effective working stretch is therefore obtained by dividing the total draft force $Ft$ corresponding to the maximum force contemplated for the drawing bench, by the unit draft force $Fu$ for one link i.e. $n = Ft/Fu$. If $Ft = 25$ metric tons, which is substantially the maximum value required in drawing cold steel sections (25 to 30 mm. diameter), the number of links in the effective working area is $25,000/320 = 78$. This may represent a useful length of about 4.30 meters.

To this length should be added the lengths required for the closing and opening operations plus two sprocket wheel radii, about 5 meters in all, plus the bench length required for the die and associated equipment, say about 7 meters, a length intermediate between the lengths of conventional draw benches and tube benches.

The lever rollers 120 are preferably provided in the form of needle bearings as earlier indicated, and the force required to rotate all such rollers pressed between the two guide rails represents no more than about 5 or %1000 the total draft force required.

Further advantageous features of the improved drawbench illustrated will now be described.

The die 144 is positioned at the end of the bench near the starting point of the active stretch of the chain. The die 144 is adjustable in vertical position on its support 145 (FIGS. 5 and 6), which is firmly anchored on the frame 101.

Inasmuch as the pulling action in the draw bench of the invention relies exclusively on friction forces, it is evident that the operation would be badly affected by the presence of oil and grease on the surfaces of the drawn work carried over from the drawing die. Means are accordingly provided for completely removing such contaminating oil and grease prior to the insertion of the work into the draft device of the invention. As shown in FIG. 11, a sealed casing 146 is mounted on the bench beyond the die plate 144 so as to be traversed by the work, and contains a store of solvent such as trichloroethylene and means, e.g. a rotary impeller, for splashing the solvent on to the surfaces of the work. A gland 147 is provided at the input end of the casing 46 and a gland 148 having flexible, e.g. rubber, wiper strips engaging the work is provided at the outlet from the casing 146 to wipe the work dry of solvent. A similar arrangement to that of FIG. 11 can be used in drawing cold-shaped welded steel tubes.

For other types of work, such as hot-shaped welded tubes, such degreasing arrangement is obviously unnecessary, since the tube is shaped at high temperature say 800–900° C. However, as shown in FIG. 12, the welding station 149 is followed by a cooling station since the work should be cooled to a temperature not more than 450° C. to avoid damage to the antifriction linings of the grippers 119. The cooling station 150 may comprise a simple water spraying arrangement.

The general operation of a continuous draw-bench according to the invention will be evident from the explanations given above, and a brief additional description will suffice. In starting the draw bench in operation, a "leader" bar having the desired final diameter is preferably welded to the free end of the roll comprising the steel strip to be drawn. This initiating or leader bar should be of such length as to reach to the end of the effective pulling zone of the endless chain. To facilitate the insertion of this bar all the hydraulic presser units such as 34 are initially retracted to open all the grippers. After insertion of the lead bar, the hydraulic units are actuated to their advanced pressing position. The drive motor is then started to rotate the drive shaft 7, whereupon the system operates as earlier described.

The drawn section or tube may be passed directly from the outlet of the bench into a conventional straightening machine using sets of rollers, thence to a cutting station for cutting the moving work to desired lengths. All the above steps may be performed in a fully automatic manner.

If the work requires a second drawing pass, the work may be passed directly to a second drawbench according to the invention mounted in line with the first, and the two operations may be carried out simultaneously and continuously, at hardly any increase in cost, in contrast with conventional drawing installations where two passes involve costs substantially twice as high as a single pass. If the second pass is a finishing pass, so as to require only a relatively very low draft force, a finishing die 153 is advantageously positioned at the output end of the bench (FIG. 11), so that the same draft device serves to pull the work through both die plates. To avert buckling of the work, the finishing die 153 should be positioned as close as possible to the circular outlet guide 127 and rollers 154 or other suitable guide means may be provided to hold the work straight throughout the compressed length of it and prevent its buckling. A drawing plant as just described is capable of high precision work, to within 2/100 mm. tolerances, completed in a single operation.

In accordance with one advantageous modification of the draw bench of the invention, both the advancing and receding stretches of the endless chain may be used for simultaneously drawing two different sets of work in opposite directions. Thus, the lower stretch of the endless chain in the embodiment shown may be equipped with hydraulic presser units similar to those shown for the upper chain stretch. Of course the drawing capacity in each direction is then only one half the capacity achievable when only one side of the chain is active. A double-acting drawbench of this kind may be equipped with a die plate at each end. Preferably a double acting drawbench as just described is arranged with the sprocket wheels rotated about vertical rather than horizontal axes, that is, with the chain arranged in a horizontal rather than in a vertical plane.

Various other changes and modifications will readily be conceived without exceeding the scope of the invention. In all cases it will be seen that extremely desirable drawing installations can be constructed in accordance therewith for performing continuous drawing operations instead of the discontinuous operations heretofore considered necessary.

In a simplified winch arrangement according to the invention, the endless chain means for supporting the gripper devices may be replaced by a wheel, with the gripper devices supported radially from the rim of the wheel. The elongated object to be pulled, e.g. a rope, would then be passed adjacent to an arcuate segment of the wheel rim so as to be exposed to the gripping and pulling action of an adequate number of gripper devices at any time.

What is claimed is:

1. In a machine for moving an elongated article lengthwise, an element movable in a path substantially parallel to said article, a series of gripper devices, each gripper device comprising a pair of elongated members disposed on opposite sides of said article in a common plane passing through said article and extending longitudinally with respect to said article, means pivotally mounting each member adjacent the trailing end thereof on said element for pivotal movement of the leading end of each member toward and away from said article, an article engaging jaw projecting inwardly from each member between the ends thereof toward said article and cam means disposed on opposite sides of said element, said cam means having a portion formed to engage the leading ends of said members upon movement of said element to pivotally move said members toward said article to provide gripping engagement between said jaws and said article and a second portion on said cam means spaced from said first portion in the direction of travel of said element and formed to engage the leading ends of said members to pivotally move said members away from said article and release said gripping engagement, said members serving to multiply the force exerted by said cam means to increase the gripping engagement of said jaws and the position of said jaws on said members tending to retain said jaws in engagement with said article.

2. A machine as defined in claim 1, in which said element comprises an endless chain having a portion movable in a path substantially parallel to said article.

3. The machine claimed in claim 1, including a support for said cam means, and means pivotally mounting said support for limited oscillatory displacement about an axis normal to the general plane of said element.

4. The system claimed in claim 1, including means mounting at least part of said cam means transversely to said path, resilient means for normally displacing said part to a position tending to move the members to gripping position, and means operable for displacing said part against said resilient means for preventing such movement of the members.

5. In a machine for moving an elongated article lengthwise along a straight path, an endless drive chain having a stretch portion determining said path, a plurality of gripping devices carried by said chain to successively grip successive parts of said article and move the latter along said path, each gripping device comprising a pair of two-armed levers having a longer arm pivoted at one end to said chain for swinging motion respectively about one of two transversely spaced parallel axes, means extending in parallelism with said chain beyond said stretch portion thereof for guiding the other end of said longer arms so as to maintain the latter substantially lengthwise of the chain in the direction of travel thereof, each lever having a shorter arm near the pivot axes of the corresponding longer arm and extending at such an angle and in such a direction therefrom as to constitute with the shorter arm of the other lever a pair of opposed clamping jaws, and means extending along said stretch portion of the chain for guiding said other end of the longer arms so as to move said clamping jaws toward each other at one end of said path and to move said clamping jaws away from each other at the other end of said path.

References Cited in the file of this patent
UNITED STATES PATENTS

| | | |
|---|---|---|
| 1,124,761 | Lloyd | Jan. 12, 1915 |
| 1,321,729 | Friel | Nov. 11, 1919 |
| 1,351,938 | Allen | Sept. 7, 1920 |
| 1,647,506 | Coughtry | Nov. 1, 1927 |
| 2,598,190 | Offutt | May 27, 1952 |
| 2,742,144 | Meyerbach | Apr. 17, 1956 |
| 2,784,329 | Bessiere | Mar. 5, 1957 |